United States Patent [19]

Cole

[11] 4,176,637

[45] Dec. 4, 1979

[54] APPARATUS FOR ELECTROSTATIC FUEL MIXING

[75] Inventor: James D. Cole, Dundee, Ill.

[73] Assignee: F. D. Farnam Co., Lyons, Ill.

[21] Appl. No.: 784,550

[22] Filed: Apr. 4, 1977

Related U.S. Application Data

[63] Continuation-in-part of Ser. No. 549,947, Feb. 14, 1975, Pat. No. 4,023,544.

[51] Int. Cl.[2] .................. F02M 29/00; F02C 7/22

[52] U.S. Cl. .................. 123/119 E; 123/141; 60/39.71

[58] Field of Search .................. 123/119 E, 141, 131; 60/39.71; 431/2; 261/76, DIG. 12; 48/180 R

[56] References Cited

U.S. PATENT DOCUMENTS

| | | | |
|---|---|---|---|
| 1,021,079 | 3/1912 | Stewart | 123/131 |
| 1,295,513 | 2/1919 | Johnson | 48/180 R |
| 2,102,800 | 12/1937 | Killmeyer et al. | 261/76 |
| 2,659,199 | 11/1953 | Thompson | 60/39.71 |
| 3,266,783 | 8/1966 | Knight | 123/119 E |
| 3,537,829 | 11/1970 | Ott | 123/119 E |
| 3,749,545 | 7/1973 | Velkoff | 123/119 E |
| 3,832,152 | 8/1974 | Prygrocki | 123/131 |
| 3,841,824 | 10/1974 | Bethel | 60/39.72 |
| 3,937,007 | 2/1976 | Kappler | 60/39.71 |
| 3,973,543 | 8/1976 | Nakada | 123/141 |
| 4,023,544 | 5/1977 | Cole | 123/119 E |
| 4,088,104 | 5/1978 | Ibbott | 123/141 |

FOREIGN PATENT DOCUMENTS

| | | | |
|---|---|---|---|
| 1190803 | 5/1970 | United Kingdom | 123/141 |

*Primary Examiner*—Carlton R. Croyle
*Assistant Examiner*—Thomas I. Ross
*Attorney, Agent, or Firm*—Mason, Kolehmainen, Rathburn & Wyss

[57] ABSTRACT

A method and apparatus for mixing fuel and an oxidizing agent includes an electrically charged electrode which forms an electrostatic field through which a stream of fuel is passed so that the fuel particles become electrostatically charged and subsequently repel one another to disperse into and mix with an oxidizing agent and vaporize on contact with a heat source such as the wall surface of an intake manifold of an internal combustion engine or the walls of fuel burning apparatus, or combustion chambers of jet or rocket engines and the like. Fuel particles passing through the electrostatic field are charged by induction charging and in addition may also be electrostatically charged by direct contact with the electrode, which is provided with an open outlet end to permit a relatively unobstructed flow of intermixed fuel and oxidizing agent with a minimum of flow resistance and little possibility of ice formation.

12 Claims, 7 Drawing Figures

APPARATUS FOR ELECTROSTATIC FUEL MIXING

CROSS-REFERENCE TO RELATED APPLICATION

The present invention relates to a new and improved apparatus for electrostatic mixing of fuel and an oxidizing agent for use in a combustion process such as that carried on in an internal combustion engine, a fuel burner, and the like, and the present application is a continuation-in-part of prior copending U.S. patent application, Ser. No. 549,947, filed Feb. 14, 1975, entitled "Pre-Combustion Conditioning Device for Internal Combustion Engines," now matured into U.S. Pat. No. 4,023,544, and the disclosure of this prior application is hereby incorporated into the present application by reference.

BACKGROUND OF THE INVENTION

1. Field of the Invention

The present invention relates to a new and improved method and apparatus for electrostatically charging fuel particles to provide better dispersion and mixing with an oxidizing agent such as air for subsequent combustion in an internal combustion engine, fuel burner and the like. In the prior copending application, a precombustion fuel conditioning device is provided for use with internal combustion engines wherein fuel is passed through a relatively fine wire screen which is charged with a positive potential with respect to the engine and the intake conduit. The voltage applied to the screen mesh may be relatively low and is conviently obtained from a twelve volt battery and the like. As the fuel air mixture passes through the electrostatically charged screen, the fuel particles are electrostatically charged by physical contact with the electrode and the charged particles repel one another and are attracted by the opposite charge on the hot intake manifold or conduit leading to the combustion chambers of the engine. The fuel particles strike the hot intake manifold wall surfaces and absorb heat from the wall surfaces which is utilized to vaporize the fuel droplets and this results in a better and more complete intermixing of the fuel and air providing better engine performance and fuel economy.

It is recognized that contact charging of the fuel particles passing through a charged screen mesh is an advantageous means for achieving better vaporization and mixing of the fuel and air or oxidizing agent. However, in the present invention, it is recognized that fuel particles or droplets flowing in a fuel stream may be electrostatically charged more effectively by means of induced charges on the particles which does not require physical contact between the fuel and the charging electrode. This type of field charging is provided by passage of the fuel stream through an electrostatic field so that the fuel particles accumulate charges through induction. This affords an advantage in that direct contact of the fuel particles with an electrode is not necessarily required and thus high flow resistance against the flow of fuel and oxidizing agent is reduced. With field induced charging, the flow of the fuel oxidizing agent mixture is relatively unimpeded by the electrode and excellent mixing and dispersion of the fuel within the oxidizing agent or air is achieved both by the induced static charges and by contact charging to some extent.

2. Description of the Prior Art

The prior art devices have utilized various means such as electrically heated grids or wires to improve fuel vaporization in a moving stream of air or other oxidizing agent. Catalytic surfaces have also been provided to promote better and more efficient precombustion mixing and interdispersion between the fuel and air mixture. Heater type devices have the disadvantage of requiring relatively large amounts of electrical energy for the heating elements and the catalytic devices are relatively expensive because of the high cost of applying expensive catalyst coating of flow confining surfaces of an induction manifold system.

In the present invention, the fuel particles are charged by an induction process as they move through an electrostatic field and once so charged, the particles in the stream tend to break apart and disperse outwardly to intermix with the oxidizing agent (usually air). The dispersed fuel droplets strike the hot wall surfaces of the intake manifold system of an engine and the fuel droplets are vaporized by the available heat from the hot manifold wall surfaces. The amount of electrical energy required to provide the electrostatic charging field is considerably smaller than that required to heat an electrical resistance heater or grid and a convenient source of high voltage potential for use on the electrodes of the present invention is usually available from an engine ignition coil when the invention is utilized with an internal combustion engine. Similarly, in fuel burners of various types, electric ignitions are often readily available and these provide a convenient source of electrical potential which may be effectively utilized for charging an electrode with high voltage to establish an electrostatic field around the fuel flow path.

SUMMARY OF THE INVENTION

The foregoing and other objects and advantages of the present invention are accomplished in a new and improved method and apparatus for mixing fuel and an oxidizing agent, which mixture is to be subsequently used in a combustion process of an internal combustion engine, a fuel burner or other combustion processes. A stream of fuel is passed in an unobstructed way through an electrostatically charged field in which electrostatic charges are induced on the fuel particles and this causes the particles to begin to repel one another and disperse into a fine spray or mist. The dispersed fuel droplets are then drawn by electrostatic force to a chamber wall of opposite polarity, thereby greatly increasing the ratio of fuel surface to liquid fuel volume. Vaporization and hence completeness of combustion is also enhanced by the fact that the dispersed fuel particles contact the relatively high temperature surfaces of the surrounding combustion chamber or intake manifold of an engine or fuel burning device.

While the illustrated embodiments of the present application are directed mainly toward internal combustion engines, the method and apparatus of the invention are useful in a wide variety of applications wherein fuel is combusted with an oxidizing agent. Fuels of a wide variety and oxidizing agents other than air are readily utilized with the invention. For example, the method and apparatus of the present invention can be effectively used with both gaseous and liquid fuels and with fuel burning apparatus such as that provided on boilers, furnaces and the like. Jet aircraft engines and rocket engines may also be more efficiently operated when the method and apparatus of the present invention is applied thereto.

BRIEF DESCRIPTION OF THE DRAWINGS

For a better understanding of the present invention, reference should be had to the following detailed description taken in conjunction with the drawings in which.

DESCRIPTION OF THE PREFERRED EMBODIMENTS

In the copending United States patent application previously referred to and incorporated herein by reference, electrostatic charging of the fuel particles or droplets is achieved primarily by the actual direct contact of the fuel with a charged electrode in the form of a screen or grid positioned across the flow path of the fuel and air mixture. In certain applications on fuel burners or in particular types of internal combustion engines, the passage of the fuel air mixture through a fine wire or grid screen impedes somewhat the flow of the mixture and in certain atmospheric conditions, a tendency to produce and form ice on the screen may be present. The present invention, however, provides a means for achieving excellent mixing and dispersion of a fuel within an oxidizing agent such as air, without the aforementioned icing difficulty and in particular, provides for electrostatic charging of fuel particles or droplets primarily by induction charging by movement through an electrostatic field formed by a tubular shaped, open ended electrode rather than by requiring direct physical contact between the fuel droplets of the fuel air stream with the surface of an electrostatically charged electrode. By the use of induced field charging as the primary charging method rather than physical contact charging, the electrodes may be designed with an open outlet or discharge end which provides an unobstructed passageway and greatly reduces the possiblity of ice formation and which also reduces high frictional resistance to the flow of the fuel and oxidizing agent mixture.

Figure 1:
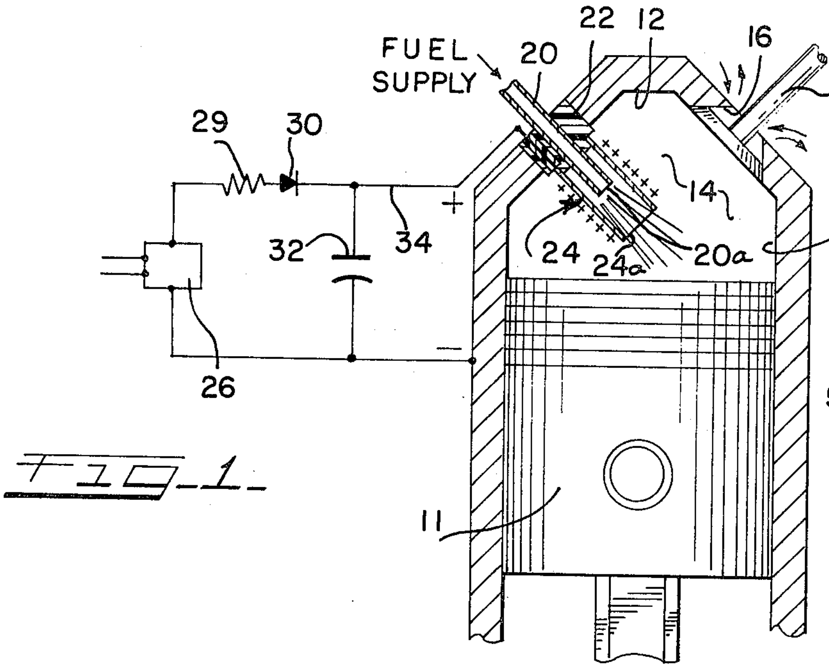
FIG. 1 is a diagrammatic cross-sectional view of the combustion chamber of a piston type internal combustion engine illustrating one embodiment of a new and improved electrostatic fuel mixing apparatus in accordance with the features of the present invention.

Referring more particularly to FIG. 1, therein is illustrated a piston type internal combustion engine including a cylinder 10 with a piston 11 reciprocally mounted therein. The cylinder includes a cylinder head portion 12 defining a combustion chamber 14 above the piston head and a pair of intake and exhaust valve openings 16 are provided in the cylinder head to admit air or other oxidizing agents and to exhaust the spent products of combustion, as respective intake and exhaust valves 18 open and close the intake and exhaust ports, in accordance with the cycle of operation of the engine.

In accordance with the features of the present invention, a liquid fuel such as gasoline or Diesel fuel used to provide combustion in the chamber 14 at the upper end of the cylinder 10 is timely injected into the cylinder through a fuel line or conduit 20 which is supported in an annular mounting plug or body 22 seated in an opening formed in the wall of the cylinder head structure 12. The fuel conduit is formed with a discharge or outlet end 20*a* which is positioned within the combustion chamber 14 containing a gaseous oxidizing agent such as air.

In accordance with the invention, an annular tubular electrode 24 is mounted in the combustion chamber in concentric alignment with the axis of the fuel conduit 20 and the electrode is supported in insulated relation from the cylinder head 12 on the body or grommet 22 which is preferably formed of electrically insulating, heat resistant material. The electrode 24 is generally cylindrical in shape and includes an inner wall surface spaced radially outwardly of the liquid fuel conduit 20, from which the electrode projects longitudinally outwardly beyond the outlet end 20*a* of the fuel conduit. An outer end or outlet 24*a* of the electrode is completely open as illustrated and offers little if any, impedance or resistance to the outward flow of fuel spray into the combustion chamber 14.

In accordance with the invention, the tubular electrode 24 is supplied with a relatively high DC electrical potential with respect to the work function of the metals involved in order to establish an electrostatic field in and around the outlet end 20*a* of the fuel conduit, wherein the fuel is sprayed into the combustion chamber in a mixing zone. Such a DC potential might be on the order of 10 volts to 25,000 volts and such voltage is applied between the tubular electrode and the cylinder 10. In practice, a voltage of at least two hundred volts is required to provide adequate field potential for the inductive charging of the fuel particles. A convenient source of such electrical potential is shown at 2*b* and is generally available either as a battery, or as the primary or secondary winding of an ignition system. If the source is AC, it may be rectified by a diode 30 into suitable DC potential which is applied to the base of the electrode 24, with a capacitor 32 being connected from the diode 30 to ground. A current limiting resistor 29 of appropriate value may be provided and a line 34 passing through the body 22 of the fuel injecting mechanism is electrically connected to the base of the cylindrical shaped charging electrode 24. The current required by the high voltage charging system is very low (on the order of microamperes) and does not affect normal operation of the engine ignition system. As the fuel is discharged from the outlet end 20*a* of the fuel conduit 20, the droplets pass through the resultant electrostatic field established by the relatively high potential DC voltage applied to the tubular electrode 24. This electrostatic field induces charges on the individual fuel particles or droplets and causes the fuel stream to break up or atomize into a fine mist or spray which spreads outwardly to thoroughly intermix with the oxidizing air present in the charging zone within the combustion chamber. Some of the outermost droplets in the fine mist or spray may directly contact the charged surface of the electrode 24 and thus in addition to induction charging, the fuel droplets may also be charged by a contact charging process. Many of the finely divided mist droplets of the liquid fuel do not come into direct contact with the surfaces of the tubular charging electrode 24 and these droplets are charged entirely by the inductive effect of the electrostatic field which is formed by the high voltage DC potential applied to the electrode 24. The outer or discharge end 24*a* of the electrode is completely open as shown and thus affords little if any impedance to the outward flow of finely dispersed liquid droplets and the air mixed therewith. The chances of carburetor icing or electrode icing are thus minimized and the impedance to fuel flow is extremely low or minimal.

Other suitable sources of electrical potential may be provided for charging the electrode 24 and these sources may include an electronic ignition system of an internal combustion engine, an ignition transformer as commonly utilized with fuel burning equipment such as oil burners. If the electrical source is AC current, a suitable rectifier circuit as described is provided to convert the AC to DC potential.

Figure 2:
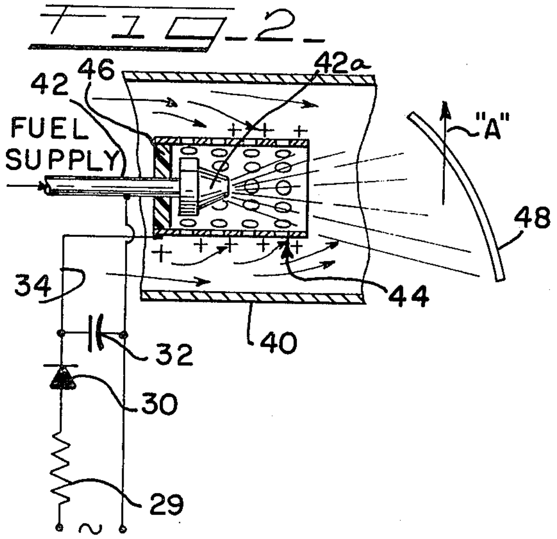
FIG. 2 is a diagrammatic cross-sectional view of the combustion chamber of a continuous combustion type jet or rocket engine illustrating another embodiment of an electrostatic fuel mixing apparatus in accordance with the features of the present invention.

Referring to FIG. 2, a combustion chamber such as a burner can of a jet engine or a rocket engine or a fuel burner chamber for a furnace or the like includes a fuel supply conduit 42 in centered axial alignment within the outer cylindrical walls of the combustion chamber 40. A discharge nozzle 42*a* is provided at the end of the fuel conduit for aiding in mechanically forming a spray of fine mist or small fuel droplets which are discharged outwardly into the chamber at high velocity. In accordance with the present invention, a tubular, annular shaped cylindrical charging electrode 44 is mounted in centered coaxial alignment around the discharge nozzle 42 in order to set up an electrostatic field for inducing charges on the fuel droplets or particles that are sprayed into the combustion chamber. The electrode is supported from the fuel conduit 42 by means of an electrically insulating annular spacer 46 and a source of high voltage DC potential such as that described in the previous embodiment is provided to set up an electrostatic charging zone around the discharge end of the fuel nozzle 42*a*. The burner can is a flow conduit 40 providing containing means for the combustion process which takes place on a continuous basis as the spray of fuel droplets disperse within the flow of air or other oxidizing agent. Energy from the combustion gases is extracted downstream of the combustion chamber by means of a turbine wheel having blades 48 which are driven by the hot gases to rotate as indicated by the arrow "A."

Figure 3:
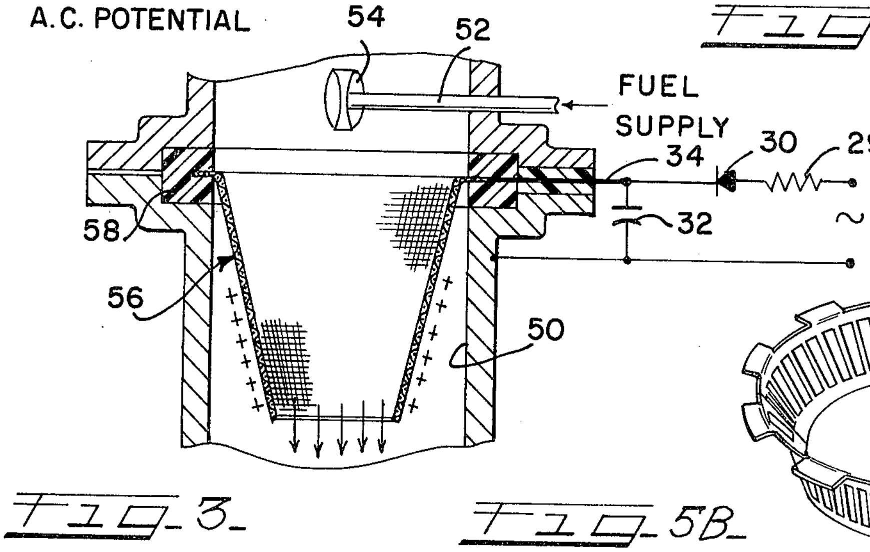
FIG. 3 is a diagrammatic cross-sectional view of a portion of an intake manifold downstream of the carburetor of an internal combustion engine illustrating yet another embodiment of an electrostatic fuel mixing apparatus in accordance with the features of the present invention.

Referring to FIG. 3, therein is illustrated a short portion of an intake manifold 50 of a conventional gasoline engine which extends between a carburetor and the combustion chambers (not shown) in the cylinders of the engine. Gasoline or other liquid or gaseous fuel is supplied to an upstream portion of the intake manifold through a fuel supply line 52 which is connected to a fuel nozzle or jet 54 in the engine carburetor. The fuel is induced into the stream of flowing air or other oxidizing agent by venturi action and in accordance with the present invention, a generally frustro-conically shaped, electrostatic charging electrode 56 in the form of a fine wire electrically conductive screen mesh is mounted downstream of the venturi nozzle 54. The frustro-conical charging electrode is open at its downstream end as shown and is supported at the larger end by an insulating ring 58 so that a high voltage DC potential may be applied to the charging electrode from a suitable source of potential through a radial lead 34. In the electrode 56 some of the fuel droplets are electrostatically charged by direct contact as they pass through the mesh of the screen, however, many of the droplets pass through the relatively large diameter outlet end without ever making direct physical contact with the surface of the charging electrode screen mesh and these fuel droplets are charged by an induction process as they move through the electrostatic field. As the fuel droplets become charged, they tend to disperse from each other and are deflected outwardly toward the inside wall surfaces of the induction manifold 50. As they strike the manifold and spread out over its surface due to the electrostatic attraction, the ratio of surface to volume of the fuel particles is maximized. Furthermore, the heat of the manifold is absorbed causing the fuel particles to vaporize and intermix with the oxidizing air stream. Thus, in the embodiment of the invention shown in FIG. 3, charging of the fuel droplets or particles takes place by means of inductive charging as the particles move through the electrostatically charged field and also by direct contact charging when the fuel particles move into contact with the screen mesh of the electrode 56.

Figure 4A:
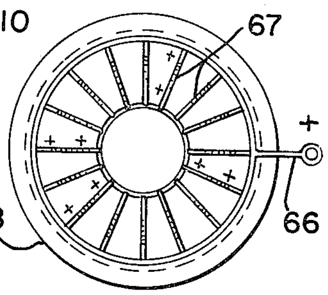
FIGS. 4A and 4B are plan and elevational views respectively, of a modified form of electrostatic field producing electrode constructed in accordance with the features of the present invention.
Figure 4B:
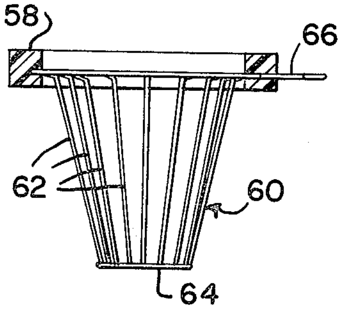

Referring to FIGS. 4A and 4B, therein is illustrated a modified form of charging electrode 60 for use in place of the electrode 56 as described. The charging electrode 60 is of a general, frusto-conical shape and includes an insulating upper ring 58 which supports a basket-like cage, comprising a plurality of elongated wire elements 62 tapering downwardly and inwardly. These elements are connected to an open wire ring 64 of relatively smaller diameter at the lower end of the cage structure. A radial terminal lug 66 is provided for connecting to the charging lead 34 of a suitable DC source.

Figure 5A:
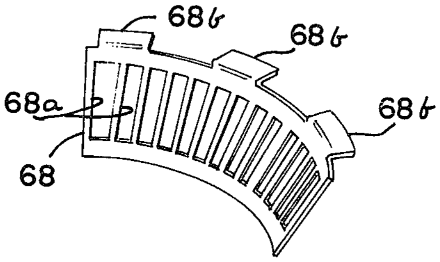
FIGS. 5A and 5B illustrate yet another embodiment of an electrostatic field forming electrode structure in accordance with the features of the present invention.
Figure 5B:
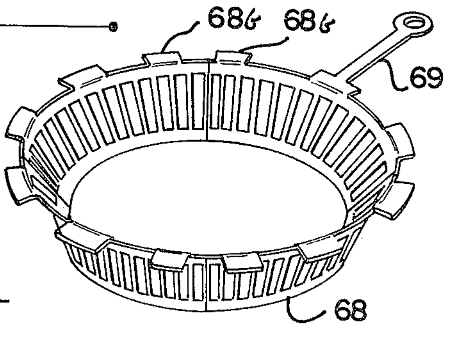

Referring to FIGS. 5A and 5B, therein is illustrated yet another embodiment of an electrode for use with the intake manifold 50 as indicated by the numeral 68. The electrode is formed from a continuous strip of metal or other electrically conductive material formed with a plurality of spaced apart rectangular openings 68*a*. The electrode strip is also provided with a plurality of lugs 68*b* along one edge and a connector lug 69 is soldered or otherwise attached to one of the lugs for connection with the charging lead 34 of the DC source of high voltage potential. In forming a frustro-conical shaped electrode 68 as shown in FIG. 5B, an appropriate length of the electrode strip 68 is cut and is then formed in a circle as shown resulting in a frustro-conical shaped element with a relatively large open outlet end. The frustro-conical electrode is then mounted in an annular insulating ring (not shown) similar to the ring 58 and the completed electrode unit is then mounted in an intake manifold structure 50 as shown in FIG. 3.

From the foregoing it will be seen that method and apparatus of the present invention results in better, more efficient mixing of fuel and an oxidizing agent, and without requiring extensive direct physical contact for electrostatically charging the fuel particles. Instead, the electrostatic charging is accomplished mainly by inductive charging as the fuel stream is discharged into an electrostatic field in a charging zone. This results in minimizing carburetor icing or screen mesh icing problems and also it reduces friction losses in the flow of a fuel and oxidizing agent mixture because of the relatively large open outlet end of the electrode.

Although the present invention has been described with reference to several illustrated embodiments thereof, it should understood that numerous other modifications and embodiments can be devised by those skilled in the art that will fall within the spirit and scope of the principles of this invention.

What is claimed as new and desired to be secured by Letters Patent of the United States is:

1. Apparatus for preparing fuel for subsequent combustion comprising:

passage means for discharging a flow of fuel through a mixing zone into a combustion zone, said passage means having an unobstructed passageway therethrough, electrode means for forming an electrostatic field to induce positive electrostatic charges in said fuel, means for heating a surface in said mixing zone, and means for applying a negative charge to a heated surface in the mixing zone, whereby the fuel strikes the surface and provides maximized ratio of fuel surface to fuel volume, the potential difference between the positive and negative charges being about two hundred volts or more.

2. The apparatus of claim 1 wherein said electrode means comprises an annular open-ended tubular structure.

3. The apparatus of claim 2 wherein said electrode comprises a grid formed by a plurality of elongated wires.

4. The apparatus of claim 2 wherein said electrode is formed of screen mesh.

5. The apparatus of claim 2 wherein said electrode is formed of thin metallic sheet material having a plurality of openings formed therein.

6. The apparatus of claim 2 wherein said electrode is of frusto-conical shape having a downstream outlet end smaller in diameter than an upstream opposite end.

7. The apparatus of claim 2 wherein said discharging means comprises a fuel conduit having an outlet positioned for discharging said fuel in said mixing zone and wherein said electrode comprises a generally cylindrical hollow wall structure spaced outwardly of said fuel conduit outlet and extends in a downstream direction thereof.

8. The apparatus of claim 7 wherein said generally cylindrical hollow wall structure is formed with a plurality of apertures for introducing said oxidizing agent into the interior thereof for mixing with said fuel in said electrostatic field.

9. The apparatus of claim 2 including in combination a flow passage for containing an oxidizing agent, said electrode means being mounted in said flow passage and electrically insulated therefrom to thereby form an electrostatic field in said flow passage for charging said fuel passing through said field.

10. The apparatus of claim 8 wherein said fuel discharge means includes a liquid conduit having an outlet end positioned inside said electrode tubular structure upstream of the open end thereof.

11. The apparatus of claim 1 in combination with means for applying a high voltage potential to said electrode for charging said fuel passing through said field.

12. The apparatus of claim 10 wherein said high voltage applying means includes an ignition coil of an internal combustion engine.

* * * * *